United States Patent
Barbotin et al.

(10) Patent No.: US 7,485,765 B2
(45) Date of Patent: Feb. 3, 2009

(54) PROCESS FOR OBTAINING A BUTADIENE HOMOPOLYMER IN THE PRESENCE OF MONOOLEFIN(S) WITH 4 CARBON ATOMS

(75) Inventors: Fanny Barbotin, Clermont-Ferrand (FR); Jean-Philippe Rasigade, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 152 days.

(21) Appl. No.: 11/129,401

(22) Filed: May 16, 2005

(65) Prior Publication Data

US 2005/0283036 A1    Dec. 22, 2005

Related U.S. Application Data

(63) Continuation of application No. PCT/EP03/12845, filed on Nov. 17, 2003.

(30) Foreign Application Priority Data

Nov. 18, 2002  (FR) .................................. 02 14482

(51) Int. Cl.
*C07C 2/02*  (2006.01)
*C07C 4/52*  (2006.01)
*C08F 136/06*  (2006.01)

(52) U.S. Cl. .................... 585/529; 585/532; 526/164; 526/340.4; 502/104; 502/117; 502/132

(58) Field of Classification Search .................. 585/527, 585/529, 532; 526/164, 340.4
See application file for complete search history.

(56) References Cited

U.S. PATENT DOCUMENTS 5,397,851 A * 3/1995 Knauf et al. .................. 526/92
6,350,833 B1 2/2002 Knauf et al.
7,056,998 B2 * 6/2006 Laubry et al. ................ 526/164

FOREIGN PATENT DOCUMENTS

JP          58154705       9/1983
WO        WO 00/69928    * 11/2000
WO        WO 02/38636 A1   5/2002

* cited by examiner

*Primary Examiner*—Glenn Caldarola
*Assistant Examiner*—In Suk Bullock
(74) *Attorney, Agent, or Firm*—Buchanan Ingersoll & Rooney PC

(57) ABSTRACT

A process is described for obtaining a 1,3-butadiene homopolymer by the reaction of a catalytic system in the presence of 1,3-butadiene and one or more monoolefin(s) with 4 carbon atoms. This catalytic system is based on at least:
  a conjugated diene monomer,
  an organic phosphoric acid salt of one or more rare earth metals, said salt being in suspension in at least one inert, saturated and aliphatic or alicyclic hydrocarbon solvent,
  an alkylating agent of the formula $AlR_3$ or $HAlR_2$, where R is an alkyl group, and
  an alkylaluminum halide halogen donor.

34 Claims, 6 Drawing Sheets

PROCESS FOR OBTAINING A BUTADIENE HOMOPOLYMER IN THE PRESENCE OF MONOOLEFIN(S) WITH 4 CARBON ATOMS

CROSS-REFERENCE TO RELATED APPLICATIONS

The present application is a continuation of PCT Application No. PCT/EP2003/012845, filed Nov. 17, 2003, published in French on Jun. 3, 2004, as WO 2004/046213 A1, which claims priority of French Application No. 02/14482, filed Nov. 18, 2002, the entire contents of both applications being incorporated herein in their entirety.

BACKGROUND OF THE INVENTION

1. Field of the Invention

The present invention relates to a process for obtaining a 1,3-butadiene homopolymer in the presence of one or more monoolefin(s) with 4 carbon atoms, for example from a steam-cracked C4 naphtha fraction, said homopolymer exhibiting microstructural and macrostructural properties making it suitable for use in tire treads.

2. Description of Related Art

Steam-cracked C4 naphtha fractions essentially contain 1,3-butadiene in a mass fraction of typically between 20 and 50% and monoolefins comprising 1-butene, 2-butene and isobutene in a mass fraction of between 70 and 40%.

Depending on whether the naphtha steam cracking is of the "low severity" type (i.e. performed at a temperature of less than 800° C. with a dwell time of the order of one second) or alternatively of the "high severity" type (i.e. performed at a temperature of almost 900° C. with a dwell time of the order of half a second), a C4 fraction is obtained which has a mass fraction of 1,3-butadiene which is respectively lower or higher in proportion to the mass fraction of the monoolefins.

With the aim of performing selective polymerization of 1,3-butadiene with elevated activity starting from a steam-cracked C4 naphtha fraction, the 1,3-butadiene content of said fraction is enriched such that the 1,3-butadiene is present in the enriched fraction in a mass fraction of close to 100%. It has in fact been found that the above-stated monoolefins impair the yield of the 1,3-butadiene polymerization reaction.

This enrichment of the C4 fraction has the drawback of requiring the performance of a complex separation process and, consequently, of entailing relatively high operating costs for homopolymerization of the 1,3-butadiene.

This is why it has in the past been attempted to perform selective polymerization of the 1,3-butadiene from an unenriched C4 fraction, i.e. containing 1,3-butadiene in a mass fraction of less than or equal to 50%.

U.S. patent specification U.S. Pat. No. 3,066,128 presents a process for the selective polymerization of butadiene starting from a steam-cracked C4 naphtha fraction, which consists in using a catalytic system based cobalt or nickel halide and an activating agent for example consisting of an alkylaluminum or an alkylaluminum chloride.

French patent specification FR-A-2,496,673 presents another process for the selective polymerization of butadiene starting from a steam-cracked C4 naphtha fraction, which consists in using a catalytic system based on a lithiated initiator.

One major drawback of these selective polymerization processes resides in the reduced polymerization yields in the presence of monoolefins which these catalytic systems bring about.

SUMMARY OF THE INVENTION

An object of the present invention is to overcome this drawback, and this object is achieved in that the applicants have unexpectedly discovered that a catalytic system based on at least:

a conjugated diene monomer, an organic phosphoric acid salt of one or more rare earth metals (metals with an atomic number between 57 and 71 in Mendeleev's periodic table), said salt being in suspension in at least one inert, saturated and aliphatic or alicyclic hydrocarbon solvent which is included in said catalytic system, an alkylating agent consisting of an alkylaluminum of the formula $AlR_3$ or $HAlR_2$, where R is an alkyl group, and a halogen donor consisting of an alkylaluminum halide, allows the selective polymerization of 1,3-butadiene in the presence of one or more monoolefin(s) with 4 carbon atoms at an elevated catalytic activity which is similar to that obtained when homopolymerizing 1,3-butadiene in the absence of monoolefin by means of the same catalytic system, in order to obtain a polybutadiene exhibiting microstructural and macrostructural properties which are very close to those exhibited by a polybutadiene obtained in the absence of monoolefin by means of said catalytic system.

Said polymerization is preferably performed at a temperature of from 25° C. to 100° C.

It will be noted that the polymerization process according to the invention makes it possible to obtain polybutadienes at elevated activity which exhibit cis-1,4 linkage contents, measured by the near-infrared analysis method ("NIR" method, see appendix 1), which are greater than 95.0%, together with inherent viscosities, measured at 25° C. at a concentration of 0.1 g/dl in toluene (see appendix 3 for measurement method), which are, for example, greater than 2 dl/g and, still more advantageously, greater than 3 dl/g.

BRIEF DESCRIPTION OF DRAWING FIGURES

Figure 5:
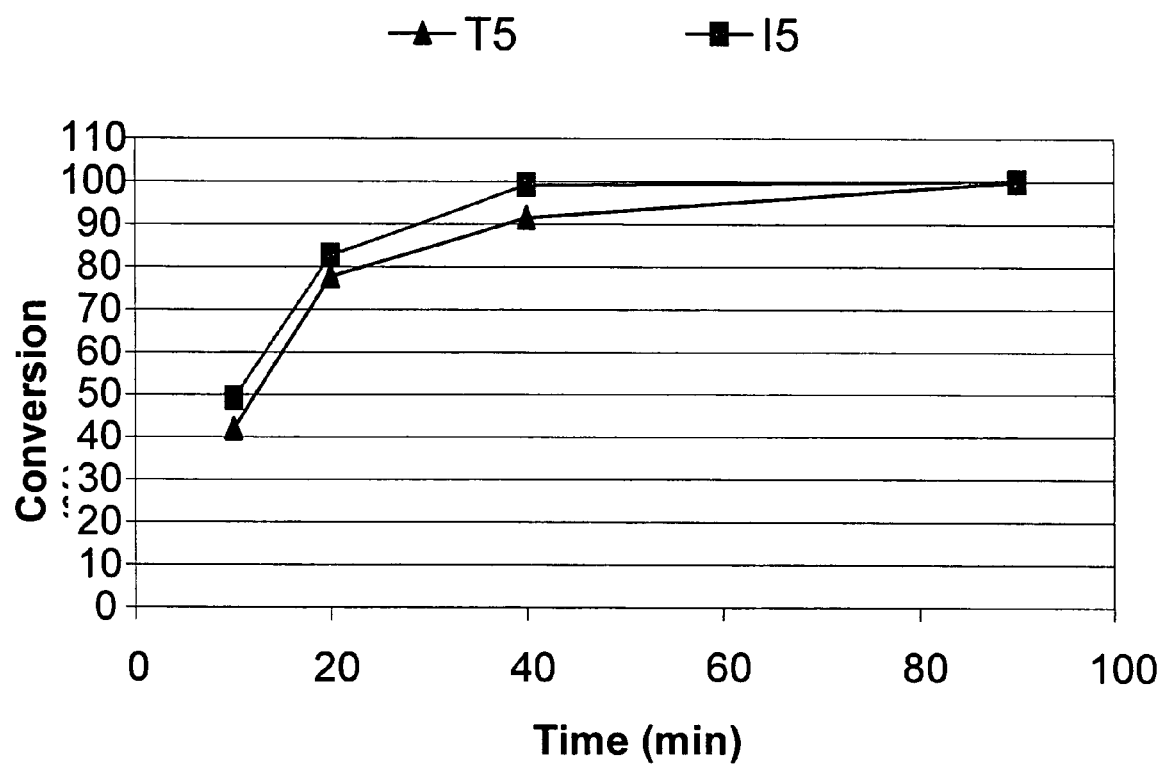
Figure 6:
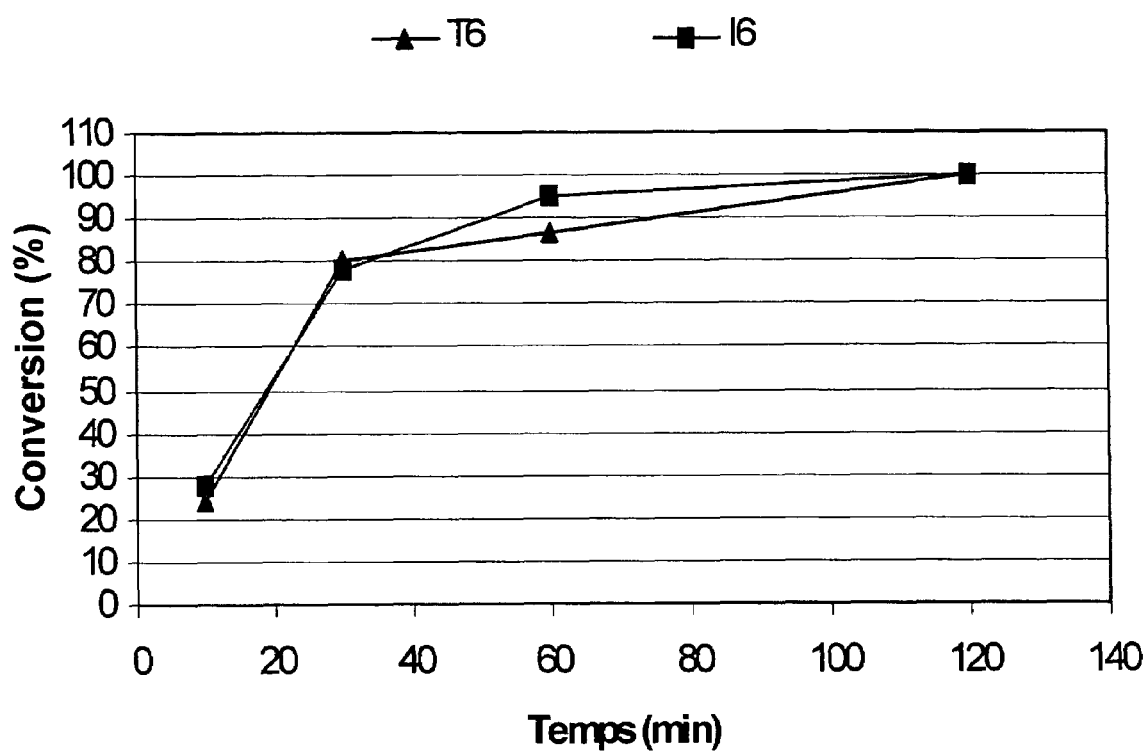

FIG. 5 is a graph illustrating the change in the degree of conversion (%) of 1,3-butadiene into polybutadiene as a function of time (min.), on the one hand, for a fifth "control" polymerization test performed in the absence of monoolefin and, on the other hand, for a fifth polymerization test according to the invention performed in the presence of 1-butene and 2-butene as the monoolefins, and FIG. 6 is a graph illustrating the change in the degree of conversion (%) of 1,3-butadiene into polybutadiene as a function of time (min.), on the one hand, for a sixth "control" polymerization test performed in the absence of monoolefin and, on the other hand, for a sixth polymerization test according to the invention performed in the presence of 2-butene as the monoolefin.

DESCRIPTION OF PREFERRED EMBODIMENTS

Advantageously, the (alkylating agent:rare earth salt) molar ratio which characterizes said catalytic system has a value of from 1 to 15, in order to obtain polybutadienes with improved catalytic activity which exhibit cis-1,4 linkage contents, measured by said near-infrared analysis method, which may be greater than 97.0%. More advantageously, said molar ratio has a value of from 1 to 10, in particular from 1 to 5.

Generally, it will also be noted that the catalytic systems according to the invention make it possible to obtain, in the presence of said monoolefin(s), polybutadienes which have a polydispersity index Ip, measured by the size exclusion chromatography method (see appendix 2), which is less than 2.

These combined characteristics of an inherent viscosity of greater than 2 and an Ip index of less than 2 make the polybutadienes obtained by the process according to the invention particularly well suited to use in tire treads.

Advantageously, mass ratio of (monoolefin(s):1,3-butadiene) is greater than or equal to 50%. Still more advantageously, this mass ratio is greater than or equal to 100% and, yet more advantageously, said mass ratio is greater than or equal to 150%.

According to another characteristic of the invention, said monoolefin(s) comprise 1-butene and/or 2-butene and/or isobutene.

According to an advantageous example of embodiment of the invention, the process according to the invention for obtaining a 1,3-butadiene homopolymer comprises the reaction of said catalytic system in the presence of a steam-cracked C4 naphtha fraction containing 1,3-butadiene in a mass fraction of between 20 and 50% and monoolefins comprising in particular du 1-butene and 2-butene in a mass fraction of between 70 and 40%.

Preferably, in said catalytic system, said rare earth salt is a rare earth tris[bis(2-ethylhexyl)phosphate] and, even more preferably, this rare earth salt is neodymium tris[bis(2-ethylhexyl)phosphate].

This catalytic system again preferably comprises the rare earth metal(s) in a concentration of greater than or equal to 0.005 mol/l and, still more preferably, in a concentration ranging from 0.010 mol/l to 0.060 mol/l.

Alkylating agents usable in the catalytic system of the invention which may be mentioned are alkylaluminums such as:

trialkylaluminums, for example triisobutylaluminum, or
dialkylaluminum hydrides, for example diisobutylaluminum hydride.

It will be noted that this alkylating agent preferably consists of diisobutylaluminum hydride (referred to as DiBAH in the remainder of the present description).

Halogen donors usable in the catalytic system according to the invention preferably comprise alkylaluminum monohalides and, even more preferably, diethylaluminum chloride (referred to a DEAC in the remainder of the present description).

Preferably, in said catalytic system, the (halogen donor: rare earth salt) molar ratio ranges from 2.0 to 3.5.

Preferably, in said catalytic system, the (conjugated diene monomer:salt) molar ratio ranges from 15 to 70.

Preferably, in said catalytic system, said conjugated diene monomer is butadiene.

1,3-Butadiene is preferably used as the conjugated diene monomer which may be used to "preform" the catalytic system according to the invention.

Other conjugated dienes which may be mentioned are 2-methyl-1,3-butadiene (or isoprene), 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene or any other conjugated diene having between 4 and 8 carbon atoms.

According to another characteristic of the invention, said rare earth salt consists of a non-hygroscopic powder having a slight tendency to agglomerate at ambient temperature.

According to a preferred embodiment of the invention, the inert hydrocarbon solvent in which said rare earth salt is suspended is a low molecular weight aliphatic or alicyclic solvent, such as cyclohexane, methylcyclohexane, n-heptane or a mixture of these solvents.

According to another embodiment of the invention, the solvent used to suspend the rare earth salt is a mixture of a high molecular weight aliphatic solvent comprising a paraffinic oil, for example petrolatum oil, and a low molecular weight solvent, such as those mentioned above (for example methylcyclohexane).

This suspension is prepared by dispersive grinding of the rare earth salt in this paraffinic oil in such a manner as to obtain a very fine and homogeneous suspension of the salt.

According to the invention, the process for the preparation of said catalytic system consists:

in a first stage, of preparing a suspension of said rare earth salt in said solvent,
in a second step, of adding said conjugated diene monomer to the suspension,
in a third stage, of adding said alkylating agent to the suspension comprising said monomer to obtain an alkylated salt, and
in a fourth stage, of adding said halogen donor to the alkylated salt.

I. Preparation of a Catalytic System According to the Invention:

a) Synthesis of an Aqueous Solution of Neodymium $NdCl_3$, $6H_2O$:

0.864 kg of $Nd_2O_3$, i.e. 5.10 mol of Nd, are weighed out into a reactor.

27 kg of demineralised water are added. 1.35 l of 36 wt. % strength HCl (d=1.18) are slowly added at ambient temperature.

The reaction $Nd_2O_3 + 6\ HCl + 9\ H_2O \rightarrow 2\ NdCl_3, 6H_2O$ is highly exothermic.

Once all the hydrochloric acid has been added, the solution is raised to boiling while being stirred for 30 minutes to eliminate the excess hydrochloric acid. The aqueous $NdCl_3$ solution is clear and mauve in colour. No insoluble product ($Nd_2O_3$) remains. The pH of the solution, measured at 25° C., is corrected by addition of 0.55 l of 2 mol/l sodium hydroxide solution. The final pH is virtually equal to 4.5.

b) Synthesis of an Organic Sodium Phosphate of Formula $[RO]_2P(O)ONa$ (R=2-ethylhexyl):

0.612 kg of NaOH flakes, i.e. 15.3 mol, are dissolved in a reactor containing 24 kg of demineralised water. 5.028 kg of an organic phosphoric acid (bis(2-ethylhexyl)phosphoric acid, listed in the "Aldrich" catalogue under number 23,782-5), i.e. 15.61 mol of this acid, are dissolved in another reactor containing 9 l of acetone.

The solution of said organic phosphoric acid is poured into the NaOH solution at ambient temperature. The reaction is as follows:

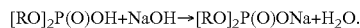

$$[RO]_2P(O)OH + NaOH \rightarrow [RO]_2P(O)ONa + H_2O.$$

The reaction is slightly exothermic and a homogeneous, clear solution is obtained. The pH of the solution, measured at 25° C., is equal to 5.4.

c) Synthesis of a Phosphated Neodymium Salt of the Formula $[[RO]_2P(O)O]_3Nd$:

The aqueous solution of $NdCl_3, 6H_2O$ obtained in paragraph a) above is poured with vigorous stirring and at a temperature of 36° C. into the solution of organic Na phosphate obtained in paragraph b) above.

A very fine white precipitate forms immediately. The resultant mixture is stirred for 15 minutes once all the aqueous $NdCl_3, 6H_2O$ has been added.

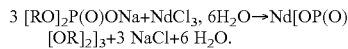

$$3\,[RO]_2P(O)ONa + NdCl_3, 6H_2O \rightarrow Nd[OP(O)[OR]_2]_3 + 3\,NaCl + 6\,H_2O.$$

The phosphated neodymium salt obtained in said manner is recovered by settling and is washed for 15 minutes with a mixture of 45 litersliters of demineralised water and 15 litersliters of acetone. The phosphated neodymium salt is then recovered by centrifugation.

The pH of the "mother liquors" is between 3 and 4 at 25° C. These "mother liquors" are colourless and clear. The result of a qualitative chloride analysis of the final washing water is practically negative (the reaction is: $NaCl + AgNO_3$ ($HNO_3$ medium) $\rightarrow AgCl\downarrow + NaNO_3$).

The neodymium salt washed in this manner is dried in an oven at 60° C. under a vacuum and a stream of nitrogen for 72 hours.

It should be noted that steps b) and c) described above may be performed without using acetone.

The mass contents of neodymium, determined both by complexometric back titration with ethylenediaminetetraacetic acid (EDTA) and by inductively-coupled plasma atomic emission spectrometry (ICP-AES), are substantially between 12.5% and 12.8% (with a theoretical content $\tau$ of 13.01% where $\tau = [144.24/1108.50] \times 100$, where 144.24 g/mol=molar mass of neodymium).

For each of these two methods, the neodymium content measurements were performed after wet acid mineralization of the salt, either in a sand bath in an open system or in a microwave oven in a closed system.

The complexometric back titration with EDTA involves back titration with complexation of neodymium with an excess of EDTA (ethylenediaminetetraacetic acid), in which the excess EDTA is determined at pH=4.6 with zinc sulfate.

A colored indicator was used with photometric detection of the equivalence point.

Inductively-coupled plasma atomic emission spectrometry is an elemental analytical method based on the observation of the radiation emitted by atoms raised to an excited state in a plasma.

The emitted radiation used for analysis of neodymium corresponds to wavelengths of 406.109 nm and 401.225 nm.

This spectrometric method was implemented by previously calibrating the system with "control" neodymium salts having a known neodymium content.

The following table shows the Nd contents obtained by means of these two methods (the number of tests performed on each salt sample is shown in brackets).

| Salt samples analyzed | Percentage Nd content by complexometric titration | Percentage Nd content by ICP/AES | Relative deviation between the 2 methods |
|---|---|---|---|
| Phosphated Nd salt $[[RO]_2P(O)O]_3Nd$ | 12.8 (9) | 12.8 (3) | 0% |
| Phosphated Nd salt $[[RO]_2P(O)O]_3Nd$ | 12.8 (4) | 12.6 (3) | 1.6% |
| Phosphated Nd salt $[[RO]_2P(O)O]_3Nd$ | 12.7 (6) | 12.2 (4) | 4% |
| Phosphated Nd salt $[[RO]_2P(O)O]_3Nd$ | 12.6 (6) | 12.5 (4) | 0.8% |
| Nd acetylacetonate "control" | 31.7 (6) | 32.4 (4) | 2.2% |
| Nd oxalate "control" | 37.7 (3) | 38.0 (3) | 0.8% |

The results obtained by the two methods are comparable (relative deviation <4%).

2) Synthesis of the Catalytic System According to the Invention from Said Salt:

a) Composition of this Catalytic System:

The catalytic system according to the invention comprises a phosphated neodymium salt as synthesised according to paragraph 1) above, said salt being in suspension in a low molecular weight inert hydrocarbon solvent (consisting of methylcyclohexane, hereinafter abbreviated to "MCH"). This catalytic system comprises neodymium in a concentration of 0.02 M, and is characterised by the following molar ratios, relative to the neodymium salt:

Nd salt:butadiene (hereafter Bd):DiBAH:DEAC=1:50:4:3 (denoted "catalyst 4" in the remainder of the present description) for controls T1 and T2 and Examples according to the invention I1 and I2;

Nd salt:Bd:DiBAH:DEAC=1:50:6:3 (denoted "catalyst 6" in the remainder of the description) for controls T3 to T5 and Examples according to the invention I3 to I5;

Nd salt:Bd:DiBAH:DEAC=1:50:10:3 (denoted "catalyst 10" in the remainder of the description) for control T6 and Example according to the invention I6.

b) Synthesis Process for this Catalytic System:

First Step 15.6 g of the powdered neodymium salt are poured into a 1 litre reactor from which any impurities have previously been removed. This salt is then subjected to nitrogen bubbling from the bottom of the reactor for a period of 15 minutes.

Second Step

The neodymium salt is brought into contact with 448 ml of MCH at 30° C. for 30 minutes.

Third Step 38 g of butadiene at a temperature of 30° C. are then introduced.

Fourth Step 63 ml of a 0.898 M DiBAH solution in MCH are then introduced and the tubing is rinsed with 37 ml of MCH. The mixture is stirred for 15 minutes at 30° C.

Fifth Step 44 ml of diethylaluminum chloride at a concentration of 0.9682 M in MCH are introduced into the reactor and the tubing is rinsed with 35 ml of MCH. The resultant mixture is preformed at a temperature of 60° C. for a period (counted from injection of the DEAC) of either 60 min for "catalyst 10" or 120 min for "catalyst 4" and "catalyst 6".

Sixth Step

In this manner, approx. 700 ml of a solution of catalytic system are obtained. The reactor is emptied and the contents transferred into a 750 ml "Steinie" bottle, which has previously been washed, dried and subjected to nitrogen bubbling.

Finally, the catalytic solution is stored under a nitrogen atmosphere in a freezer at a temperature of −15° C.

II. Butadiene Polymerization Tests in the Absence of or in the Presence of Monoolefins:

A previously washed and dried 250 ml "Steinie" bottle is used as the polymerization reactor. The polymerization reactions are performed at 50° C. for a varying length of time.

For each polymerization, cyclohexane is introduced into said Steinie bottle and is subjected to nitrogen bubbling for 10 minutes in order to eliminate any impurities, followed by 5 ml of butadiene, a variable quantity of 1-butene or 2-butene or isobutene (see § 1), 2), 3) and 4) below) and then a variable quantity of the catalytic system prepared according to § I above.

The 1-butene, 2-butene and isobutene are supplied by "Aldrich" (catalogue numbers 29,505-1, 36,335-9 and 29,546-9 respectively). All these butenes were passed over alumina to eliminate any impurities.

The S:M mass ratio (cyclohexane solvent: 1,3-butadiene monomer) is between 8.3 and 12.6 depending on the test. In order to permit comparison of the tests among themselves, the conditions are selected such that a constant ratio by volume is obtained (volume of butadiene:(volume of cyclohexane+volume of butene)).

The quantity of neodymium catalytic base varies from 173 μmol to 432.9 μmol per 100 g of butadiene, depending on the test performed.

Once polymerization is complete, the reaction is stopped with 1 ml of acetylacetone and then antioxidant (N-1,3-dimethylbutyl-N'-phenyl-p-phenylenediamine) is added at a concentration of 20 g/l in toluene in an amount of 0.4 ml (for tests nos. 1 and 2) or of 1 ml (for the subsequent tests).

Measurement of the degree of conversion of 1,3-butadiene into polybutadiene as a function of time describes the polymerization kinetics for each test.

The polydispersity index Ip (see attached appendix 2) and the inherent viscosity at 0.1 g/dl in toluene, measured at 25° C. (see attached appendix 3), characterise the macrostructure of each polybutadiene obtained.

1)Tests (no. 1) T1 and I1 of the Homopolymerization of 1,3-butadiene in the Presence of 1-butene with a "Catalyst 4":

Table 1 below states the polymerization conditions used, on the one hand, for a first "control" test T1 in which the polymerization medium contains no monoolefin and, on the other hand, for a first test according to the invention I1 in which the polymerization medium comprises 1-butene as the monoolefin.

TABLE 1

| | Polymerization conditions | | | | | Polybutadienes obtained | | | |
|---|---|---|---|---|---|---|---|---|---|
| | | Quantity of neodymium | | | | | Microstructure | | |
| Tests | Volume of catalytic system (ml) | (μmol of Nd per 100 g of Bd) | 1-Butene:1,3-butadiene (mass ratio, %) | Polym. time (min.) | Degree of conversion (%) | Ip | cis-1,4 (%) | 1,2 (%) | Inherent viscosity (dl/g) |
| 1st "control" test T1 S:M = 12.6 (by mass) | 0.5 | 309.2 | 0 | 5 | 38.7 | | | | |
| | | | | 10 | 72.3 | | | | |
| | | | | 15 | 88.1 | | | | 2.97 |
| | | | | 40 | 100 | 1.80 | 97.1 | 0 | 3.13 |
| 1st test, Invention I1 S:M = 10.7 (by mass) | 0.64 | 395.8 | 153 | 5 | 34.3 | | | | |
| | | | | 10 | 65.9 | | | | |
| | | | | 15 | 82.7 | | | | 3.11 |
| | | | | 40 | 100 | 1.91 | 98.1 | 0 | 3.16 |

Figure 1:
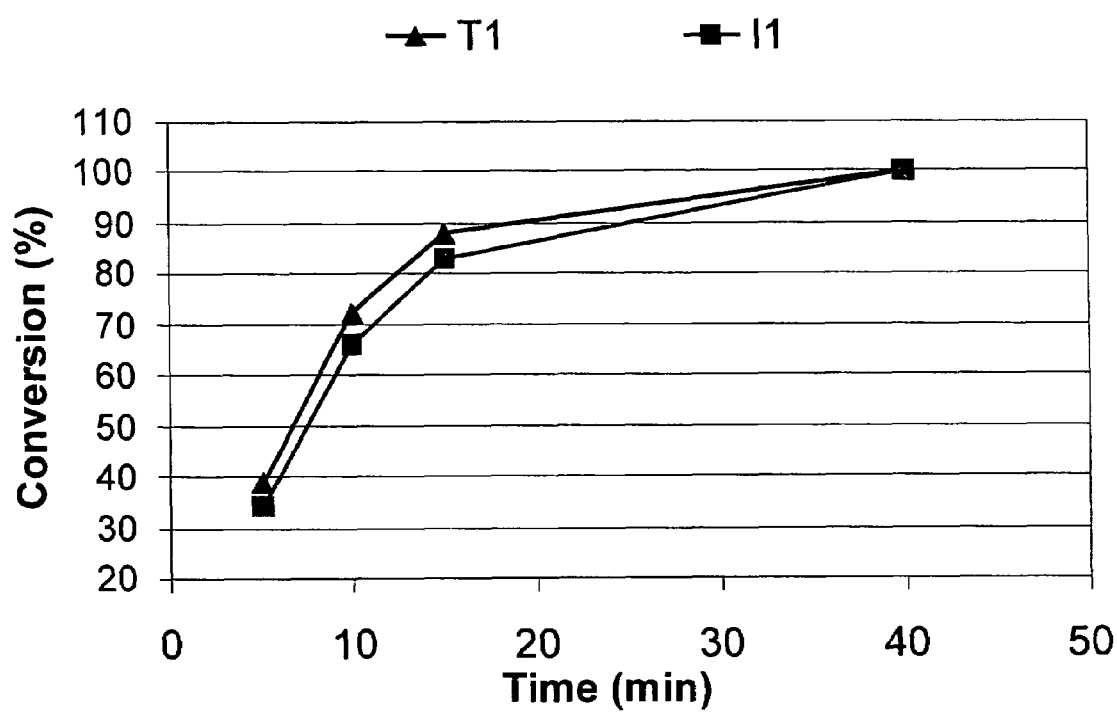
FIG. 1 is a graph illustrating the change in the degree of conversion (%) of 1,3-butadiene into polybutadiene as a function of time (min.), on the one hand, for a first "control" polymerization test performed in the absence of monoolefin and, on the other hand, for a first polymerization test according to the invention performed in the presence of 1-butene as the monoolefin.

These results show that, as can be seen in the FIG. 1, a catalytic system according to the invention comprising said conjugated diene monomer, said rare earth salt of an organic phosphoric acid in suspension in said inert, saturated hydrocarbon solvent, said alkylating agent and said halogen donor, makes it possible to homopolymerise 1,3-butadiene in the presence of 1-butene in a (1-butene:1,3-butadiene) mass ratio of greater than 150%, at elevated catalytic activity similar to that associated with the homopolymerization of 1,3-butadiene in the absence of 1-butene by means of the same catalytic system (c.f. the similarity of the polymerization kinetics curves for tests I1 and T1), in order to obtain a polybutadiene having microstructural and macrostructural properties very close to those exhibited by the "control" polybutadiene of test T1.

It will be noted that the cis-1,4 linkage content in the polybutadiene of test I1 is close to that of the polybutadiene of test T1, these contents both being greater than 97.0%.

It will also be noted that the inherent viscosity of the polybutadiene of test I1 is very close to that of the polybutadiene of test T1, these viscosities all being greater than to 3.0 dl/g, and that the polydispersity index Ip of the polybutadiene of test I1 is less than 2.0, following the example of the Ip index of the polybutadiene of test T1, these properties making the polybutadiene of test I1 suitable for use in tire treads in just the same way as the polybutadiene of test T1.

2) Tests (no. 2) T2 and I2 of the Homopolymerization of 1,3-butadiene in the Presence of 2-butene with a "Catalyst 4":

Table 2 below states the polymerization conditions used, on the one hand, for a second "control" test T2 in which the polymerization medium contains no monoolefin and, on the other hand, for a second test according to the invention I2 in which the polymerization medium contains 2-butene as the monoolefin.

T2), in order to obtain a polybutadiene having microstructural and macrostructural properties very close those exhibited by the "control" polybutadiene of test T2 (c.f. in particular the cis-1,4 linkage content, the inherent viscosity and the polydispersity index Ip).

These properties likewise make the polybutadiene of test I2 suitable for use in tire treads, following the example of the polybutadiene of test T2.

TABLE 2

| | Polymerization conditions | | | | | Polybutadienes obtained | | | |
|---|---|---|---|---|---|---|---|---|---|
| | Volume of catalytic system (ml) | Quantity of neodymium (μmol of Nd per 100 g of Bd) | 2-Butene:1,3-butadiene (mass ratio, %) | Polym. time (min.) | Degree of conversion (%) | | Microstructure | | Inherent viscosity (dl/g) |
| Tests | | | | | | Ip | cis-1,4 (%) | 1,2 (%) | |
| 2$^{nd}$ "control" test T2 S:M = 11.9 (by mass) | 0.7 | 432.9 | 0 | 5 | 50.5 | | | | |
| | | | | 10 | 87.1 | 1.69 | 97.6 | 0 | |
| | | | | 15 | 97.5 | 1.72 | 97.0 | 0 | 2.44 |
| | | | | 40 | 100 | 1.73 | 95.8 | 0 | 2.55 |
| 2$^{nd}$ test, Invention I2 S:M = 10.7 (by mass) | 0.7 | 432.9 | 74 | 5 | 50.7 | | | | |
| | | | | 10 | 86.7 | 1.73 | 97.5 | 0 | |
| | | | | 40 | 100 | 1.75 | 95.6 | 0 | 2.57 |

Figure 2:
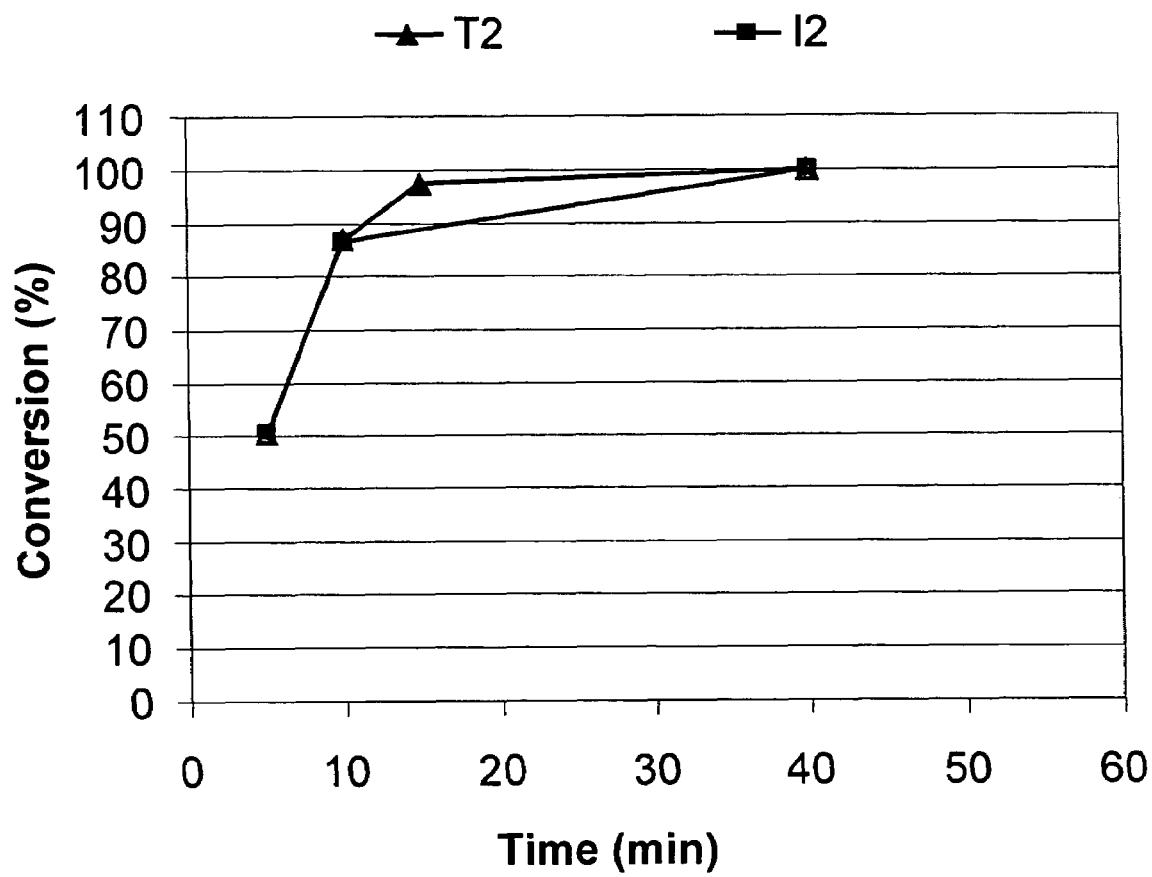
FIG. 2 is a graph illustrating the change in the degree of conversion (%) of 1,3-butadiene into polybutadiene as a function of time (min.), on the one hand, for a second "control" polymerization test performed in the absence of monoolefin and, on the other hand, for a second polymerization test according to the invention performed in the presence of 2-butene as the monoolefin.

These results show that, as can be seen in the FIG. 2, said catalytic system according to the invention makes it possible to homopolymerise 1,3-butadiene in the presence of 2-butene in a (1-butene:1,3-butadiene) mass ratio of greater than 50%, at an elevated catalytic activity similar to that associated with the homopolymerization of 1,3-butadiene in the absence of 2-butene by means of the same catalytic system (c.f. the similarity of the polymerization kinetics curves of tests I2 and 3) Tests (no. 3) T3 and I3 of the Homopolymerization of 1,3-butadiene in the Presence of Isobutene with a "catalyst 6":

Table 3 below states the polymerization conditions used, on the one hand, for a third "control" test T3 in which the polymerization medium contains no monoolefin and, on the other hand, for a third test according to the invention I3 in which the polymerization medium contains isobutene as the monoolefin.

TABLE 3

| | Polymerization conditions | | | | | Polybutadienes obtained | | | |
|---|---|---|---|---|---|---|---|---|---|
| | Volume of catalytic system (ml) | Quantity of neodymium (μmol of Nd per 100 g of Bd) | Isobutene:1,3-butadiene (mass ratio, %) | Polym. time (min.) | Degree of conversion (%) | | Microstructure | | Inherent viscosity (dl/g) |
| Tests | | | | | | Ip | cis-1,4 (%) | 1,2 (%) | |
| 3$^{rd}$ "control" test T3 S:M = 11.6 (by mass) | 0.46 | 284 | 0 | 10 | 39.4 | | | | |
| | | | | 20 | 74.8 | | | | |
| | | | | 40 | 94.9 | 1.77 | >97.4 | <0.8 | 2.72 |
| | | | | 90 | 100 | 1.86 | 97.9 | <0.8 | 2.86 |
| 3$^{rd}$ test, Invention I3 S:M = 9.8 (by mass) | 0.52 | 322 | 144 | 10 | 48.3 | | | | |
| | | | | 20 | 83.0 | | | | |
| | | | | 40 | 95.4 | 1.66 | 97.8 | <0.8 | 2.72 |
| | | | | 90 | 100 | 1.84 | 97.2 | <0.8 | 2.80 |

Figure 3:
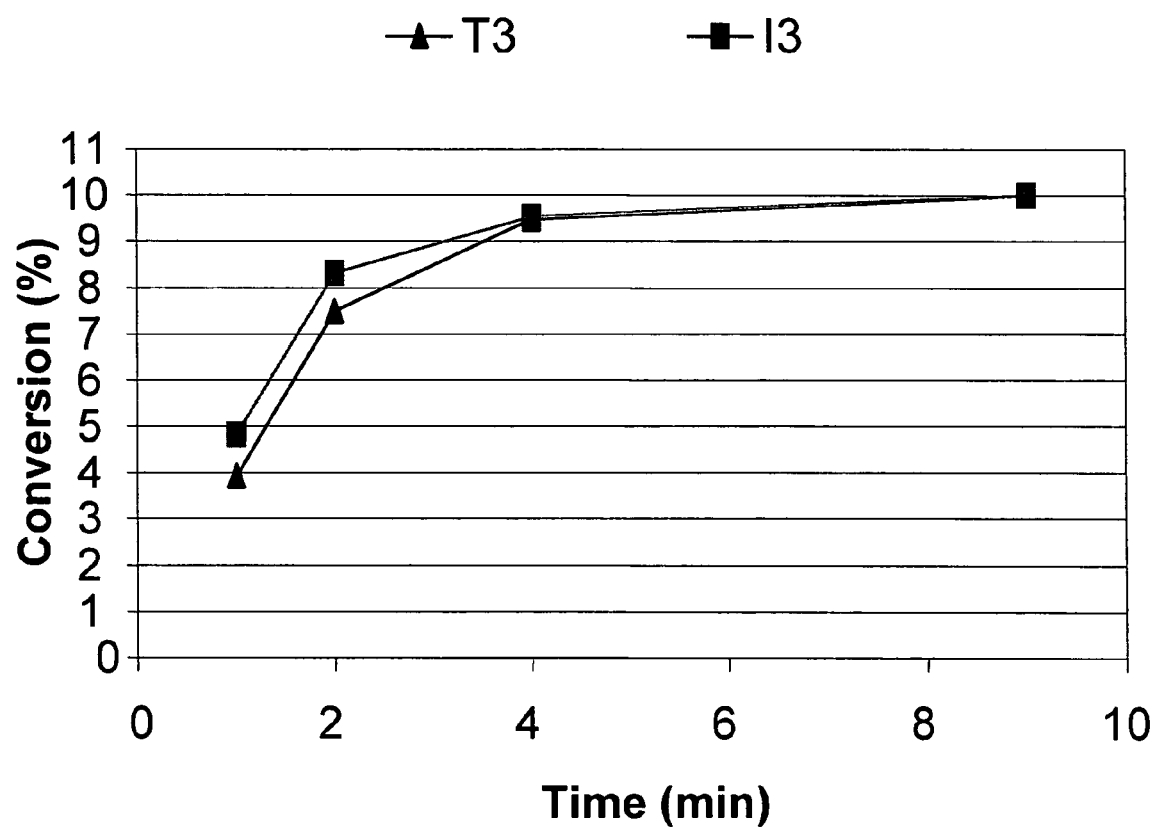
FIG. 3 is a graph illustrating the change in the degree of conversion (%) of 1,3-butadiene into polybutadiene as a function of time (min.), on the one hand, for a third "control" polymerization test performed in the absence of monoolefin and, on the other hand, for a third polymerization test according to the invention performed in the presence of isobutene as the monoolefin.

These results show that, as can be seen in the FIG. 3, a catalytic system according to the invention comprising said conjugated diene monomer, said rare earth salt of an organic phosphoric acid in suspension in said inert, saturated hydrocarbon solvent, said alkylating agent with an (alkylating agent:rare earth salt) molar ratio of 6 and said halogen donor, makes it possible to homopolymerise 1,3-butadiene in the presence of isobutene in an (isobutene: 1,3-butadiene) mass ratio of greater than 100%, at elevated catalytic activity similar to that associated with the homopolymerization of 1,3-butadiene in the absence of isobutene by means of the same catalytic system (c.f. the similarity of the polymerization kinetics curves for tests I3 and T3), in order to obtain a polybutadiene having microstructural and macrostructural properties very close to those exhibited by the "control" polybutadiene of test T3.

It will be noted that the cis-1,4 linkage content in the polybutadiene of test I3 is close to that of the polybutadiene of test T3, these contents both being greater than 97.0%.

It will also be noted that the inherent viscosity of the polybutadiene of test I3 is very close to that of the polybutadiene of test T3, these viscosities both being greater than or equal to 2.8 dl/g, and that the polydispersity index Ip of the polybutadiene of test I3 is less than 2.0, following the example of the Ip index of the polybutadiene of test T3, these properties making the polybutadiene of test I3 suitable for use in tire treads in just the same way as the polybutadiene of test T3.

4) Tests (no. 4) T4 and I4 of the Homopolymerization of 1,3-butadiene in the Presence of 1-butene with a "Catalyst 6":

Table 4 below states the polymerization conditions used, on the one hand, for a fourth "control" test T4 in which the polymerization medium contains no monoolefin and, on the other hand, for a fourth test according to the invention I4 in which the polymerization medium contains 1-butene as the monoolefin.

Figure 4:
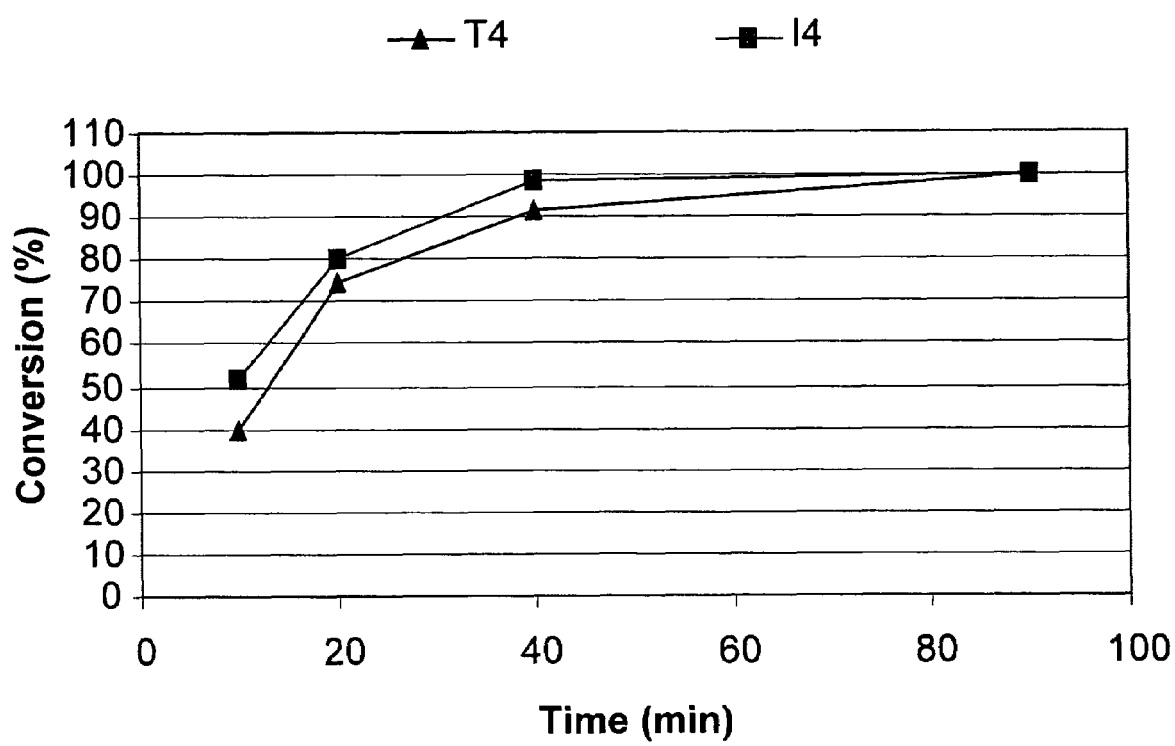
FIG. 4 is a graph illustrating the change in the degree of conversion (%) of 1,3-butadiene into polybutadiene as a function of time (min.), on the one hand, for a fourth "control" polymerization test performed in the absence of monoolefin and, on the other hand, for a fourth polymerization test according to the invention performed in the presence of 1-butene as the monoolefin.

These results shows that, as can be seen in FIG. 4, said catalytic system, with an (alkylating agent:rare earth salt) molar ratio of 6, according to the invention makes it possible to homopolymerise 1,3-butadiene in the presence of 1-butene in a (1-butene:1,3-butadiene) mass ratio of 300%, at an elevated catalytic activity similar to that associated with the homopolymerization of 1,3-butadiene in the absence of 1-butene by means of the same catalytic system (c.f. the similarity of the polymerization kinetics curves of tests I4 and T4), in order to obtain a polybutadiene having microstructural and macrostructural properties very close to those exhibited by the "control" polybutadiene of test T4 (c.f. in particular the cis-1,4 linkage content, the inherent viscosity and the polydispersity index).

These properties likewise make the polybutadiene of test I4 suitable for use in tire treads, following the example of the polybutadiene of test T4.

5) Tests (no. 5) T5 and I5 of the Homopolymerization of 1,3-butadiene in the Presence of 1-butene and 2-butene with a "Catalyst 6":

Table 5 below states the polymerization conditions used, on the one hand, for a fifth "control" test T5 in which the polymerization medium contains no monoolefin and, on the other hand, for a fifth test according to the invention I5 in which the polymerization medium contains 1-butene and 2-butene as the monoolefin. The ratio of 1-butene to 2-butene is 1.

TABLE 4

| | Polymerization conditions | | | | | Polybutadienes obtained | | | |
| | Volume of catalytic system (ml) | Quantity of neodymium (μmol of Nd per 100 g of Bd) | 1-Butene:1,3-butadiene (mass ratio, %) | Polym. time (min.) | Degree of conversion (%) | Ip | Microstructure cis-1,4 (%) | 1,2 (%) | Inherent viscosity (dl/g) |
|---|---|---|---|---|---|---|---|---|---|
| Tests | | | | | | | | | |
| 4th "control" test T4 S:M = 11.8 (by mass) | 0.4 | 247 | 0 | 10 | 40.0 | | | | |
| | | | | 20 | 74.8 | | | | |
| | | | | 40 | 91.9 | 1.96 | >97.4 | <0.8 | 3.11 |
| | | | | 90 | 100 | 2.03 | >97.4 | <0.8 | 3.16 |
| 4th test, Invention I4 S:M = 8.3 (by mass) | 0.58 | 359 | 300 | 10 | 51.8 | | | | |
| | | | | 20 | 80.2 | | | | |
| | | | | 40 | 98.7 | 2.14 | >97.4 | <0.8 | 3.10 |
| | | | | 90 | 100 | 2.14 | >97.4 | <0.8 | 3.15 |

TABLE 5

| | Polymerization conditions | | | | | Polybutadienes obtained | | | |
|---|---|---|---|---|---|---|---|---|---|
| | Volume of | Quantity of neodymium (μmol | (1-Butene + 2- | | Degree | | Microstructure | | |
| Tests | catalytic system (ml) | of Nd per 100 g of Bd) | butene)/1,3-butadiene (mass ratio, %) | Polym. time (min.) | of conversion (%) | Ip | cis-1,4 (%) | 1,2 (%) | Inherent viscosity (dl/g) |
| 5th "control" test T5 S:M = 12.0 (by mass) | 0.46 | 284 | 0 | 10 20 40 90 | 42.2 77.6 91.4 100 | 1.92 1.98 | >97.4 98.2 | <0.8 <0.8 | 2.85 2.96 |
| 5th test, Invention I5 S:M = 9.2 (by mass) | 0.55 | 340 | 222 | 10 20 40 90 | 49.0 82.8 99.3 100 | 1.95 1.96 | >97.4 98.0 | <0.8 <0.8 | 2.87 2.98 |

These results shows that, as can be seen in FIG. 5, said catalytic system, with an (alkylating agent:rare earth salt) molar ratio of 6, according to the invention makes it possible to homopolymerise 1,3-butadiene in the presence of 1-butene and 2-butene in a ((1-butene+2-butene):1,3-butadiene) mass ratio of greater than 200%, at an elevated catalytic activity similar to that associated with the homopolymerization 1,3-butadiene in the absence of 1-butene and 2-butene by means of the same catalytic system (c.f. the similarity of the polymerization kinetics curves of tests I5 and T5), in order to obtain a polybutadiene having microstructural and macrostructural properties very close to those exhibited by the "control" polybutadiene of test T5 (c.f. in particular the cis-1,4 linkage content, the inherent viscosity and the polydispersity index).

These properties likewise make the polybutadiene of test I5 suitable for use in tire treads, following the example of the polybutadiene of test T5.

6) Tests (no. 6) T6 and I6 of the Homopolymerization of 1,3-butadiene in the Presence of 2-butene with a "Catalyst 10":

Table 6 below states the polymerization conditions used, on the one hand, for a sixth "control" test T6 in which the polymerization medium contains no monoolefin and, on the other hand, for a sixth test according to the invention I6 in which the polymerization medium contains 2-butene as the monoolefin.

TABLE 6

| | Polymerization conditions | | | | | Polybutadienes obtained | | | |
|---|---|---|---|---|---|---|---|---|---|
| | Volume of | Quantity of neodymium (μmol | 2- | | Degree | | Microstructure | | |
| Tests | catalytic system (ml) | of Nd per 100 g of Bd) | Butene:1,3-butadiene (mass ratio, %) | Polym. time (min.) | of conversion (%) | Ip | cis-1,4 (%) | 1,2 (%) | Inherent viscosity (dl/g) |
| 6th "control" test T6 S:M = 11.9 (by mass) | 0.28 | 173 | 0 | 10 30 60 120 | 23.9 79.9 86.7 100 | 1.92 1.95 | >97.4 >97.4 | <0.8 <0.8 | 2.72 2.80 |
| 6th test, Invention I6 S:M = 10.0 (by mass) | 0.30 | 186 | 152 | 10 30 60 120 | 27.4 78.0 95.1 100 | 1.98 1.94 | >97.4 >97.4 | <0.8 <0.8 | 2.66 2.77 |

These results shows that, as can be seen in FIG. 6, said catalytic system, with an (alkylating agent:rare earth salt) molar ratio of 10, according to the invention makes it possible to homopolymerise 1,3-butadiene in the presence of 2-butene in a (2-butene:1,3-butadiene) mass ratio of greater than 150%, at an elevated catalytic activity similar to that associated with the homopolymerization of 1,3-butadiene in the absence of 2-butene by means of the same catalytic system (c.f. the similarity of the polymerization kinetics curves of tests I6 and T6), in order to obtain a polybutadiene having microstructural and macrostructural properties very close to those exhibited by the "control" polybutadiene of test T6 (c.f. in particular the cis-1,4 linkage content, the inherent viscosity and the polydispersity index).

These properties likewise make the polybutadiene of test I6 suitable for use in tire treads, following the example of the polybutadiene of test T6.

APPENDIX 1

Determination of the Microstructure of the Polybutadienes Obtained

"Near infrared" (NIR) analysis was used. This is an indirect method making use of "control" elastomers whose microstructure has been measured by $^{13}C$ NMR. The quantitative relationship (Beer-Lambert law) prevailing between the distribution of the monomers in an elastomer and the shape of the elastomer's NIR spectrum is exploited. This method is carried out in two stages:

1) Calibration:

Spectra of the "control" elastomers are acquired.

A mathematical model is constructed which associates a microstructure to a given spectrum using the PLS (partial least squares) regression method, which is based on a factorial analysis of the spectral data. The following two documents provide a thorough description of the theory and practice of this "multi-variant" method of data analysis:
  (1) P. GELADI and B. R. KOWALSKI "Partial Least Squares regression: a tutorial", Analytica Chimica Acta, vol. 185, 1-17 (1986).
  (2) M. TENENHAUS "La régression PLS—Théorie et pratique" Paris, Editions Technip (1998).

2) Measurement:

The spectrum of the sample is recorded.

The microstructure is calculated.

APPENDIX 2

Determination of the Distribution of Molecular Weights of the Elastomers Obtained by Size Exclusion Chromatography (SEC)

a) Measurement Principle

SEC (size exclusion chromatography) makes it possible physically to separate macromolecules by their size in the swollen state in columns filled with a porous stationary phase. The macromolecules are separated by their hydrodynamic volume, the bulkiest being eluted first.

b) Preparation of the Polymer

The polymer sample is not subjected to any particular treatment prior to analysis. It is simply solubilized in tetrahydrofuran to a concentration of approximately 1 g/l.

c) SEC Analysis

The apparatus used is a "WATERS ALLIANCE" chromatograph. The elution solvent is tetrahydrofuran, the flow rate is 1 ml/min, the temperature of the system is 35° C. and the duration of the analysis is 30 min. A set of two "Styragel HT6E" columns connected in series is used.

The volume of polymer sample solution injected is 100 µl. The detector is a "WATERS 2410" differential refractometer and the chromatographic data processing software is the "WATERS MILLENNIUM" system.

APPENDIX 3

Determination of the Inherent Viscosity at 25° C. of a Solution of Polybutadiene at 0.1 g/dl in Toluene, on the Basis of a Solution of Dry Polybutadiene Principle:

Inherent viscosity is determined by measuring the polymer solution drain time t and the toluene drain time $t_0$ in a capillary tube.

The method is broken down into 3 major steps:
  step no. 1: preparation of the 0.1 g/dl measurement solution in toluene;
  step no. 2: measurement of polymer drain time t and toluene drain time $t_0$ at 25° C. in an "Ubbelohde" tube";
  step no. 3: calculation of inherent viscosity.

STEP No. 1—Preparation of the Measurement Solution from Dry Polymer:

0.1 g of dry polymer (using a precision balance, scale e=0.1 mg) and 100 ml of toluene of a purity greater than 99.5% are introduced into a 250 ml bottle which has been washed and oven-dried at 140° C. for at least 10 hours.

The bottle is placed on a vibratory shaker for 90 minutes (check whether the polymer has not passed into solution).

STEP No. 2—Measurement of Toluene Drain Time to and Polymer Solution Drain Time t at 25° C.:
1. Equipment:
  1 tank with a bath thermostatically-controlled to 25° C.±0.1° C. provided with a mains water cooling system. The tank is filled ¼ with mains water and ¾ with demineralised water.
  1 "PROLABO" alcohol thermometer with an uncertainty of ±0.1° C. placed in the thermostatically-controlled bath
  1 "Ubbelohde" viscosimetric tube intended to be placed in a vertical position in the thermostatically-controlled bath.
Characteristics of the Tubes Used:
diameter of capillary: 0.46 mm;
capacity: 18 to 22 ml.
2. Measurement of Toluene Drain Time $t_0$:
rinse the tube out by washing with toluene;
introduce the quantity of toluene (purity greater than 99.5%) required for the measurement;
check that the thermostatically-controlled bath is at 25° C.;
determine the drain time $t_0$.
3. Measurement of the Polymer Solution Drain Time t
rinse the tube out by washing with the polymer solution;
introduce the quantity of polymer solution required for the measurement;
check that the thermostatically-controlled bath is at 25° C.
determine the drain time t.
STEP No. 3—Calculation of Inherent Viscosity:

Inherent viscosity is obtained by the following relationship:

$$\eta_{inh} = \frac{1}{C} \ln\left[\frac{(t)}{(t_o)}\right]$$

where

C: concentration of the solution of polymer in toluene in g/dl;

t: drain time of the polymer solution in toluene in hundredths of a second;

$t_0$: toluene drain time in hundredths of a second;

$\eta_{inh}$: inherent viscosity stated in dl/g.

The invention claimed is:

1. A process for obtaining a 1,3-butadiene homopolymer comprising reacting a catalytic system in the presence of 1,3-butadiene and one or more monoolefin(s) having 4 carbon atoms, wherein said catalytic system is based on at least:
   a conjugated diene monomer,
   an organic phosphoric acid salt of one or more rare earth metals, said salt being in suspension in at least one inert, saturated and aliphatic or alicyclic hydrocarbon solvent,
   an alkylating agent of the formula $AlR_3$ or $HAlR_2$, where R is an alkyl group, and
   a halogen donor comprising an alkylaluminum halide, wherein the (alkylating agent:rare earth salt) molar ratio falls within a range of from 1 to 15.

2. The process according to claim 1, wherein the (monoolefin(s):1,3-butadiene) mass ratio is greater than or equal to 50%.

3. The process according to claim 2, wherein the (monoolefin(s):1,3-butadiene) mass ratio is greater than or equal to 100%.

4. The process according to claim 3, wherein the (monoolefin(s):1,3-butadiene) mass ratio is greater than or equal to 150%.

5. The process according to claim 1, wherein said monoolefin(s) comprise 1-butene and/or 2-butene.

6. The process according to claim 1, wherein said monoolefin(s) comprise isobutene.

7. The process according to claim 1, wherein the reaction of said catalytic system occurs in the presence of a steam-cracked C4 naphtha fraction.

8. The process according to claim 7, wherein said C4 fraction comprises 1,3-butadiene in a mass fraction of between 20 and 50%, and said monoolefins in a mass fraction of between 70 and 40%.

9. The process according to claim 1, wherein, in said catalytic system, said rare earth salt is a rare earth tris[bis(2-ethylhexyl)phosphate].

10. The process according to claim 1, wherein said halogen donor is diethylaluminum chloride.

11. The process according to claim 1, wherein, in said catalytic system, the (halogen donor:rare earth salt) molar ratio falls within a range of from 2.0 to 3.5.

12. The process according to claim 1, wherein, in said catalytic system, the (conjugated diene monomer:rare earth salt) molar ratio falls within a range of from 15 to 70.

13. The process according to claim 1, wherein, in said catalytic system, said conjugated diene monomer is butadiene.

14. The process according to claim 1, wherein, in said catalytic system, said alkylating agent is diisobutylaluminum hydride.

15. The process according to claim 1, wherein said 1,3-butadiene homopolymer has a cis-1,4 linkage content, measured according to the near-infrared analysis method, which is greater than 95.0%.

16. The process according to claim 1, wherein said 1,3-butadiene homopolymer exhibits both an inherent viscosity, measured to 25° C. in a concentration of 0.1 g/dl in toluene, which is greater than 2 dl/g and a polydispersity index, measured by the size exclusion chromatography method, which is less than 2.5.

17. The process according to claim 1, wherein the (alkylating agent:rare earth salt) molar ratio falls within a range of from 1 to 10.

18. The process according to claim 9, wherein the rare earth salt is neodymium tris[bis(2-ethylhexyl)phosphate].

19. A process for obtaining a 1,3-butadiene homopolymer comprising reacting a catalytic system in the presence of 1,3-butadiene and one or more monoolefin(s) having 4 carbon atoms, wherein said catalytic system is based on at least:
   a conjugated diene monomer,
   an organic phosphoric acid salt of one or more rare earth metals, said salt being in suspension in at least one inert, saturated and aliphatic or alicyclic hydrocarbon solvent,
   an alkylating agent of the formula $AlR_3$ or $HAlR_2$, where R is an alkyl group, and
   a halogen donor comprising an alkylaluminum halide, wherein the (monoolefin(s):1,3-butadiene) mass ratio is greater than or equal to 50%.

20. The process according to claim 19, wherein the (monoolefin(s):1,3-butadiene) mass ratio is greater than or equal to 100%.

21. The process according to claim 20, wherein the (monoolefin(s):1,3-butadiene) mass ratio is greater than or equal to 150%.

22. The process according to claim 19, wherein said monoolefin(s) comprise 1-butene and/or 2-butene.

23. The process according to claim 19, wherein said monoolefin(s) comprise isobutene.

24. The process according to claim 19, wherein the reaction of said catalytic system occurs in the presence of a steam-cracked C4 naphtha fraction.

25. The process according to claim 24, wherein said C4 fraction comprises 1,3-butadiene in a mass fraction of between 20 and 50%, and said monoolefins in a mass fraction of between 70 and 40%.

26. The process according to claim 19, wherein, in said catalytic system, said rare earth salt is a rare earth tris[bis(2-ethylhexyl)phosphate].

27. The process according to claim 19, wherein said halogen donor is diethylaluminum chloride.

28. The process according to claim 19, wherein, in said catalytic system, the (halogen donor:rare earth salt) molar ratio falls within a range of from 2.0 to 3.5.

29. The process according to claim 19, wherein, in said catalytic system, the (conjugated diene monomer:rare earth salt) molar ratio falls within a range of from 15 to 70.

30. The process according to claim 19, wherein, in said catalytic system, said conjugated diene monomer is butadiene.

31. The process according to claim 19, wherein, in said catalytic system, said alkylating agent is diisobutylaluminum hydride.

32. The process according to claim 19, wherein said 1,3-butadiene homopolymer has a cis-1,4 linkage content, measured according to the near-infrared analysis method, which is greater than 95.0%.

33. The process according to claim 19, wherein said 1,3-butadiene homopolymer exhibits both an inherent viscosity, measured to 25° C. in a concentration of 0.1 g/dl in toluene, which is greater than 2 dl/g and a polydispersity index, measured by the size exclusion chromatography method, which is less than 2.5.

34. The process according to claim 26, wherein the rare earth salt is neodymium tris[bis(2-ethylhexyl)phosphate].

* * * * *